Oct. 11, 1966  B. C. HUDGENS  3,277,833
HYDRAULIC DEVICE

Filed March 16, 1964  2 Sheets-Sheet 1

INVENTOR.
BERNARD C. HUDGENS

BY Woodling, Krost,
Granger and Rust
Attys.

Oct. 11, 1966 B. C. HUDGENS 3,277,833
HYDRAULIC DEVICE

Filed March 16, 1964 2 Sheets-Sheet 2

INVENTOR.
BERNARD C. HUDGENS
BY Woodling, Krost,
Granger and Rust
attys.

United States Patent Office 3,277,833
Patented Oct. 11, 1966

3,277,833
HYDRAULIC DEVICE
Bernard C. Hudgens, West Lafayette, Ind., assignor to TRW Inc., a corporation of Ohio
Filed Mar. 16, 1964, Ser. No. 352,019
5 Claims. (Cl. 103—130)

The present invention relates in general to a hydraulic device such as a pump or motor of the internal gear type wherein the outer element has one more tooth than the inner element and the axis of the movable one of the elements when rotated thereabout is caused to orbit about the axis of the other of the elements and more particularly to a new and novel means of sealing the high and low pressure sides of the hydraulic device from each other which are caused by the relative movement of the teeth on one element relative to the teeth on the other element.

With present-day manufacturing techniques in producing the two elements referred to above, (one of which is usually referred to as a stator element and one a rotor element) the combination of which is commonly referred to herein as an internal gear set, there has been very little success from the standpoint of economical production. In the following description the use of the term "internal gear set" shall be taken to include a pump or motor wherein at least one of the two main elements rotates about its axis and whose axis orbits relative to the axis of the other element. In order to produce such a set with acceptable leakage tolerances, the manufacturing costs are inordinately high. When an extremely accurate internal gear set is produced by grinding, lapping, selective fitting, or other comparatively costly operation, the additional disadvantage often results that the parts will not turn freely because of the close tolerances.

It is, therefore, an object of the present invention to provide an internal gear set which, according to normal standards, has very large tolerances and yet has leakage characteristics which are better than the most accurately produced presently existing internal gear sets.

Another object of the present invention is to provide an internal gear set wherein the movement between the parts is much smoother than prior or conventional devices of this kind wherein comparable leakage characteristics are obtained by interference fits between the parts, etc.

Another objects of the present invention is to provide a vane construction carried by the teeth of one element of an internal gear set for engagement with the other element to prevent leakage therebetween.

Another object of the present invention is to provide a vane construction carried by each tooth of the rotor of an internal gear set which rotor both rotates and orbits relative to a stator which has one more tooth than the rotor whereby substantially only one and not more than two vanes are active at any one time thereby producing smoother and more efficient operation.

Another object of the present invention is to provide a vane construction for each tooth of the rotor in an internal gear set wherein the vane is in contact with the stator substantially only when it is the principal sealing means between the high and low pressure sides of the tooth which carries it.

Another object of the present invention is to provide a vane construction for the teeth of the rotor of an internal gear set wherein a resilient means is employed to constantly urge the vane outwardly to be in active position to engage a tooth on a stator and which has mechanical means of limiting its outward movement to prevent loss of same during inactive conditions.

Another object of the present invention is to provide a vane construction for an internal gear set which is capable of reducing the leakage from ¼ to ½ of that obtainable by the most accurately machined internal gear set without the vane construction.

Another object of the present invention is to provide a vane construction for each tooth of the rotor of a rotating and orbiting internal gear set whereby each vane construction is accomplishing a sealing function for only a small portion of a complete cycle of the set.

Other objects and a fuller understanding of this invention may be had by referring to the following description and claims, taken in conjunction with the accompanying drawings, in which:

Figure 1:
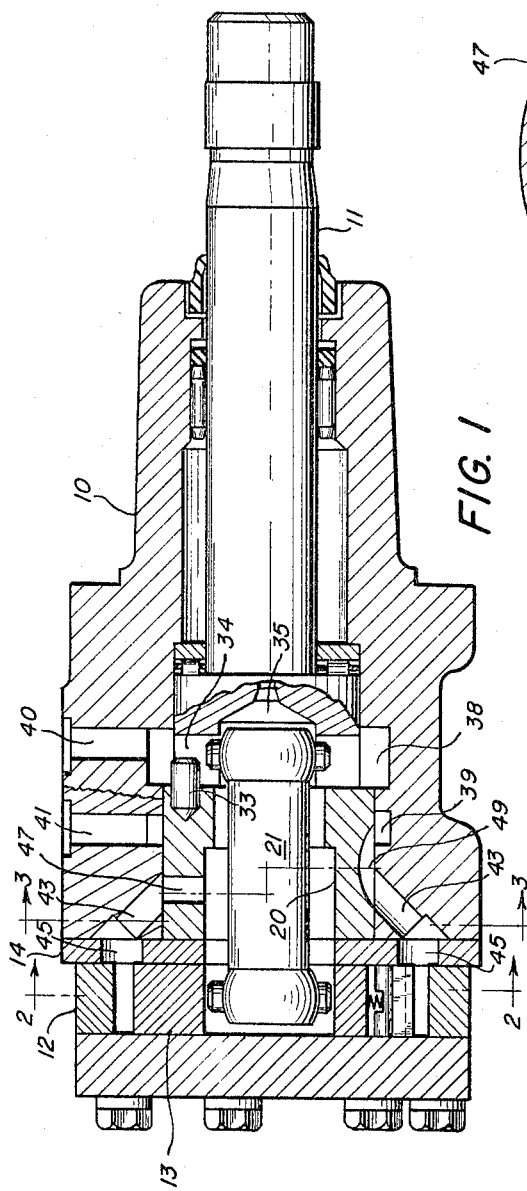
FIGURE 1 is an elevational view in section of a hydraulic device, more specifically a pump which incorporates the teachings of the present invention.

The present invention as mentioned hereinabove relates to the new and improved means for sealing between the rotor element and stator gear element of the internal gear set which is utilized in a hydraulic device. In other to properly describe the environment within which the present invention resides, it is necessary to discuss to some length the construction of the hydraulic device. To this end, the device illustrated, particularly in FIGURES 1, 2 and 3, will be described as a pump with those skilled in the art readily recognizing the interchangeability of the device to function as a motor.

The pump which has been shown comprises a housing 10 which receives a drive shaft 11 through a bore therein which shaft can be driven by any appropriate means. The pump elements are located in the housing opposite the shaft 11 or at the left end of FIGURE 1, and these elements comprise an outer fixed stator gear element 12 and an inner rotatable rotor element 13. These two elements are located between the left end of the housing 10 and a wear plate 14 suitably held in position by screws.

A commutating valve spool 20 is rotatably located in the bore of the houisng between the shaft 11 and the pump elements and through this valve spool extends a shaft 21 which transmits the rotation of shaft 11 to the rotor element 13. It will be apparent from reviewing FIGURES 1 and 2 that the connection between the one end of shaft 21 and the end of shaft 11 amounts to a universal joint connection as well as the connection of the other end of shaft 21 to the rotor element. These universal type connections do not form a part of the teachings of the present invention and they will not be discussed further herein. The purpose of these connections is to permit the rotor element 13 to partake of its rotational and orbiting movement which will be discussed in more detail hereinafter. In the specific device shown herein, the rotor element is formed with teeth 23, in this embodiment specifically six in number, and the stator gear element is constructed with one more tooth, sometimes referred to as lobes 25, in this embodiment specifically seven in number. As will be noted, each of the lobes comprises a generally continuously curved surface 27. For the sake of further explanation, the rotor element has an axis indicated by the point 26 in FIGURE 2 and the stator element has an axis indicated by the point 28.

Figure 2:
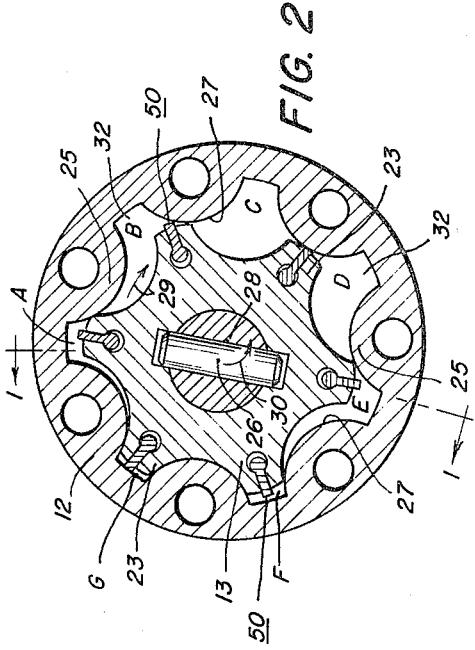
FIGURE 2 is a view taken generally along the line 2—2 of FIGURE 1.

Rotation of the shaft 11 in an appropriate direction will cause the rotor to rotate about its own axis 26 in the direction of arrow 29 (FIGURE 2). However, the rotor axis 26 will orbit about the stator axis 28 in the opposite direction or in the direction of arrow 30. The result of this action is to cause the pockets 32 formed between the stator lobes 25 to pass through alternately contracting pressure cycles or strokes and expanding intake or suction strokes. In the specific pump shown, namely a rotor element with six teeth and a stator element with seven teeth or lobes, the rotor axis will orbit about the stator axis six times for each complete rotation of shaft 11, and each orbit will produce seven pressure pulses or strokes. At any one intsant of time there are 3+ pockets undergoing an exhaust or pressure stage and 3+ pockets in the intake or suction stage. One revolution of the drive shaft will therefore produce six orbits or 42 pump or pressure pulses.

To facilitate connection of the alternately expanding and contracting pockets 32 with a source of fluid supply and exhaust, the shaft 11 has been connected to the commutating valve sleeve 20 by way of a drive pin 33 which projects from the valve sleeve into one end of a slot 34 in the left end 35 of the drive shaft. This causes the commutating valve spool 20, the rotor element 13, and the drive shaft 11 to travel at substantially the same rotational speed.

The bore of the housing 10 is provided with two annular grooves 38 and 39 which communicate respectively with radial passages 40 and 41 opening in the sides of the housing 10 and adapted for connection to conduits through which the fluid enters and leaves the pump. The groove 38 is located in the plane of the slot 34 and therefore is in constant communication with the interior of the commutating valve spool 20 while the groove 39 is located within the axial limits of the valve spool 20. A circumferential series of ports 43 extend at one end to the bore of the housing and at the other end through holes 45 in the wear plate 14 to the pockets 32 between the lobes of the stator gear element 12. The commutating valve spool is provided with a plurality of circumferentially spaced radial passages 47, (further identified by letters a, b, c, d, e, and f) which extend from the outer surface thereof to the hollow inside, and located between these radial passages 47 are provided corresponding numbers of axially extending grooves 49 (further identified by letters a', b', c', d', e' and f'). These grooves 49 extend axially a length sufficient to provide a fluid bridge between the ports 43 and the annular groove 39 when the grooves 49 and ports 43 are in axial alignment with each other.

Figure 3:
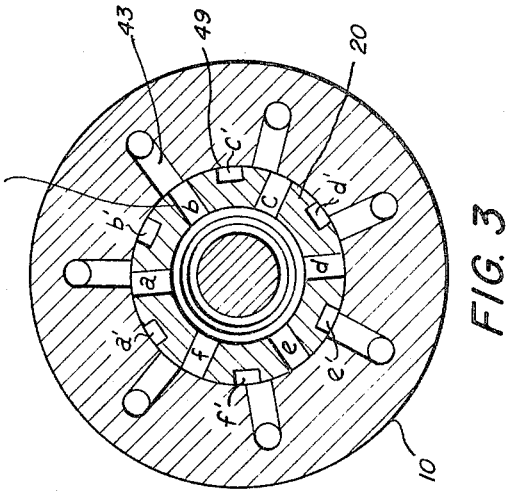
FIGURE 3 is a view taken generally along the line 3—3 of FIGURE 1.

In order to give an understanding of the mode of operation of the pump and cooperation of the stator gear element 12 and the rotor element 13 with the commutating valve spool, reference is best had to FIGURES 1, 2 and 3 of the drawings. The sectional views shown in FIGURE 2 and 3 show the rotor element and the commutating valve spool in the same angular position they occupy relative to each other because of their mechanical connection with the drive shaft 11. Assuming that the drive shaft 11 is being rotated in a clockwise direction 29 as viewed in FIGURE 2, it will be seen that pockets A, B and C are on an intake stroke, pockets D, E and F are on a pressure stroke, and pocket G is at the point of completing a pressure stroke and just prior to starting an intake stroke. Referring to FIGURE 3, it will be seen that pockets A, B and C are being connected to the fluid input side of the pump through radial passages a, b, and c, whereas pockets D, E and F communicate with the pressure or output side of the pump by way of axial grooves d', e' and f', whereas pocket G is in what may be referred to as a transition position being neither connected to the radial passage f or axial groove a'. From this description it will be apparent how the rotating and orbiting rotor element produces successively alternating pump and intake strokes in the various pockets 32 and how the action of the commutating valve spool appropriately connects the pockets undergoing pump strokes to the pressure side of the pump and at the same time connects the expanding pockets undergoing an intake stroke to the intake side of the pump. It will thus be seen that as a given tooth on the rotor element moves along a curved surface 27 into a pocket 32 to produce a pump stroke, that a given pocket rotationally behind the referred to tooth is producing an intake stroke. Referring to FIGURE 2, it will be seen that the tooth which is undergoing the intake stroke may be immediately behind the tooth producing pump stroke or it may be the second or third tooth behind depending upon which tooth is taken as the reference tooth, because as described hereinabove, at least three pump pulses are being produced and at least three intake pulses.

If the shaft 11 is rotated in a reverse direction it will be obvious that the condition of the pockets will be reversed and passages a, b, and c will be connected to the output side of the pump and grooves d', e' and f' will be connected to the input side of the pump. The general overall construction of this hydraulic device is shown in U.S. Patent No. 3,087,436, issued April 30, 1963.

Figure 5:
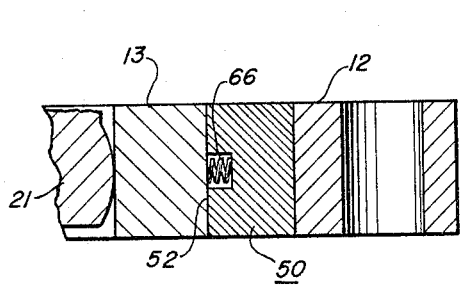
FIGURE 5 is a view taken generally along the line 5—5 of FIGURE 4.
Figure 4:
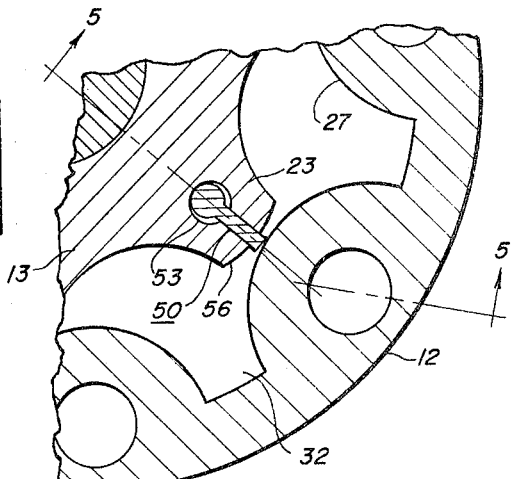
FIGURE 4 is an enlarged fragmentary view of a portion of FIGURE 2.
Figure 7:
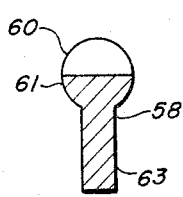
FIGURE 7 is a view taken generally along the line 7—7 of FIGURE 6.
Figure 6:
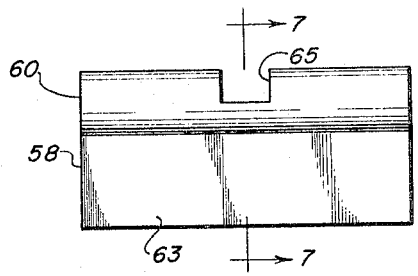
FIGURE 6 is an elevational view of the vane construction shown in FIGURES 2, 4 and 5 and removed from the rotor of the pump.

The improvement of the present invention in this particular combination comprises a vane assembly, indicated generally by the reference numeral 50, for each of the six teeth on the rotor element 13. Referring particularly to the enlarged view of FIGURE 4 as well as FIGURES 5, 6 and 7, it will be seen that each of the vane assemblies comprises wall means 52 in each of the rotor element teeth which, as seen in FIGURES 4 and 5, defines an opening which extends the entire width of the rotor and in cross-section as seen in FIGURE 4, the opening has a generally circular appearance indicated by numeral 53 which opens into a rectangularly shaped opening in cross-section, comprised of two generally parallel walls which in turn open onto the tip 56 of each of the rotor element teeth. It will be appreciated by those skilled in the art that shapes other than circular may be used and as a result at times the term annular may be used. It will be seen that this opening as viewed in FIGURES 2 and 4 extends generally radially of the rotor. Positioned in each of the openings defined by the wall means 52 is a vane member 58 which has a head portion 60 with a surface 61 which corresponds in part to the generally circular shape of the wall means 52. The vane member has a body portion 63 which resides in that portion of the opening defined by the parallel walls and extends outwardly beyond the tip of the rotor element tooth. As seen in FIGURES 5 and 6, the vane member has a cutaway portion 65 within which is adapted to reside a spring member 66 which constantly serves to urge the vane member to its outermost or extended position. The material of construction of this vane member for the sake of a specific example may be constructed of sintered iron.

Figure 9:
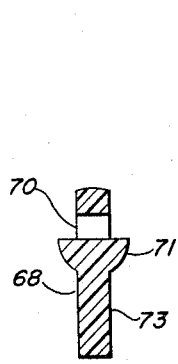
Figure 8:
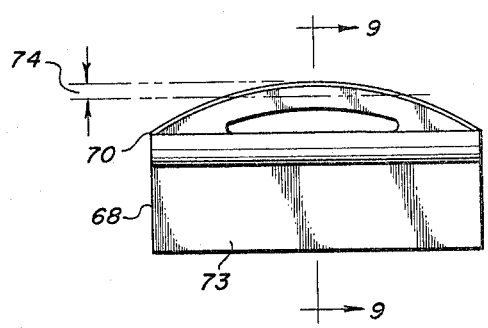
FIGURE 8 is an elevational view similar to FIGURE 6 but showing a modification of the vane construction; and, FIGURE 9 is a view taken generally along the line 9—9 of FIGURE 8.

FIGURES 8 and 9 illustrate a modification of the vane member 58. This vane member is indicated generally by the reference numeral 68 and includes a head portion 70 with a surface 71 adapted to engage a portion of the circularly curved wall means 52. The vane member also has a body portion 73 which resides in the same position and serves the same function as the body portion 63 on vane member 58. The construction of this vane member is glass-filled nylon or equivalent material and the head portion is constructed in such manner that the head portion will compress the dimension 74 when the head portion is inserted into the circular portion of the wall means 52. In this modification the compression of the resiliently elastic member serves the function of constantly urging the vane member to its extending position in the same manner as the spring member 66 in combination with vane member 58.

The head portion 60 along with the surface 61 of vane member 58 and the head portion 70 in combination with the surface 71 of vane member 68, which are adapted to engage a portion of the wall means 52, constitute a mechanical means of retaining the vane members within their respective openings and preventing them from becoming over-extended or being completely removed from the openings when they are in an inactive position during the pumping cycle.

Referring specifically to FIGURE 2, it will be seen that the vane member for a particular rotor tooth is active, or in other words is in engagement with the curved surface of a stator gear element lobe, for only a small portion of the entire rotational cycle. In the specific embodiment indicated, this engagement occurs over only substantially 20° of angular movement as measured from the axis 28 of the stator gear element. Each of these vane members is slidable over the curved surface 27 of a stator lobe substantially only when it is the principal sealing means between a pocket which is going through a pump stroke and a pocket which is going through an intake stroke at a position rotationally behind. For example, referring to FIGURE 2, it will be seen that the vane on the rotor tooth immediately between pockets D and C is in engagement with the stator gear element lobe and serves to separate pocket D which is on a pump stroke from pocket C which is just completing an intake stroke. Pockets D and E at the angular position indicated need not be necessarily well sealed since both of these pockets are undergoing a pump stroke. The vane on the rotor tooth between pockets B and C is just beginning contact with the stator lobe because at this point pocket C is nearly ready to begin a pump stroke whereas pocket B will still be continuing on an intake stroke. It will thus be seen that in most instances, one vane is in active contact with the stator lobe, however, there are no more than two vanes active at any one time, thus contributing to the fact that there is very little frictional drag between the vanes and the stator lobes because the action and function of the combination of the present invention is to remove the vanes from contact with the stator lobes when they are not serving their function of sealing between a pocket on a pump stroke and a pocket on an intake stroke, thus greatly reducing frictional drag and contributing to the smoothness of operation of the device. In the particular mechanical construction of the internal gear set which includes the stator gear element and the rotor element and the configuration of the teeth thereon, the maximum contact angle between the tip of the vane member 58 and the curved surface of the lobe 25 is approximately 30°. In other words, the force vector tending to push the vane radially in its slot toward the center of the rotor element is approximately 30° from the plane of the body portion of the vane member. While it is desirable that the contact angle not exceed 50° to 60°, it is possible to produce a device which will function with the contact angle as high as from 81° to 85° assuming a coefficient of friction of approximately .15 to .18.

It will therefore be apparent to those skilled in the art that in accordance with the teachings of the present invention an internal gear set can be advantageously produced which has very poor tolerances from a comparison of presently existing standards necessary to produce a workable device and yet which has leakage characteristics which are better than the most accurately produced presently existing internal gear sets. This improvement in leakage characteristics has cut the leakage from ¼ to ½ of that obtainable with presently existing devices. As a result of this ability to reduce the manufacturing tolerances, it has been possible to provide an internal gear set which moves much more smoothly with resultant efficiency in operation. The vane type of construction which has been described hereinabove and which is provided for each tooth of the rotating and orbiting rotor element does not produce substantial additional frictional contact because there are no more than two of the vanes in engagement with the stator lobe at any one given time. The construction is such that the vanes are in engagement substantially only when they are performing their functions as the principal sealing means between the high and low pressure sides of the tooth which carries the given vane. Also because of the construction of the present invention, a means is provided which constantly urges the vane outwardly or into active position so that it will be engageable with a stator gear element lobe when called upon to perform its function but which also has mechanical means for retaining it from too much travel or complete loss from the rotor tooth when it is in an inactive position. When the present construction is being used as a pump, differential pressure is available to help seal the vanes against the stator lobes, and this pressure will in most cases create a greater force than the resilient means. Referring to FIGURE 4, fluid pressure leaks by the body portion of the vane on the pressure side of the rotor tooth (pocket D side) into the opening which houses the head portion and exerts a force tending to hold the vane against the stator lobe. An opposite force is exerted on the vane but is smaller in magnitude because of the difference in area that the fluid pressure acts on. It is conceivable that in some instances the fluid pressure may be sufficient without the resilient means. When the present device is used in a hydrostatic power steering system, there is normally a low differential pressure across an active vane and as a result the resilient means is the primary force keeping the vane in contact with a stator lobe.

Although this invention has been described in its preferred form with a certain degree of particularity, it is understood that the present disclosure of the preferred form has been made only by way of example and that numeous changes in the details of construction and the combination and arrangement of parts may be resorted to without departing from the spirit and the scope of the invention as hereinafter claimed.

What is claimed is:

1. In an internal gear pump having a fixed stator gear element with a plurality of lobes defining pockets, a movable rotor element having a plurality of teeth interfittable into said pockets upon rotation of said rotor element, said stator gear element having one more pocket than said rotor element has teeth, rotation of said rotor element about its axis causing orbiting of its axis about the axis of said stator gear element, each lobe of said stator gear element comprising a continuously curved surface, each rotor element tooth having a tip and being movable adjacent said curved surface into a pocket to produce a pump stroke with a pocket rotationally behind being on an intake stroke; the improvement comprising a vane assembly for each rotor element tooth, each said vane assembly comprising wall means in each said rotor element tooth defining an opening extending the width thereof and in cross-section being generally annular in shape radially inwardly of said rotor element tooth tip and opening onto said rotor element tooth tip in two generally parallel walls, a vane in each rotor element tooth opening having a head portion corresponding at least in part to said generally annular shape of said opening and residing therein and having a body portion extending along said generally parallel walls of said opening and beyond said rotor element tooth tip, resilient means acting on said vane head to urge said vane at all times to an extended position, each said vane being slidable over said curved surface of a stator lobe only when it is the principal sealing means between a pump stroke in a pocket and an intake stroke in a pocket rotationally behind, not more than two vanes being active at any one time, the angle of contact between said vanes and said curved lobe surfaces being not larger than about 30 to 60 degrees.

2. In an internal gear hydraulic device having a fixed stator gear element with a plurality of lobes defining pockets, a movable rotor element having a plurality of teeth interfittable into said pockets upon rotation of said rotor element, said stator gear element having one more pocket than said rotor element has teeth, rotation of said rotor element about its axis causing orbiting of its axis about the axis of said stator gear element, each rotor element tooth having a tip and being movable adjacent a lobe into a pocket on a pressure stroke with an adjacent pocket being on an intake stroke; the improvement comprising a vane assembly for each rotor element tooth, each said vane assembly comprising wall means in each said rotor element tooth defining an opening extending the width thereof and in cross-section being generally annular in shape radially inwardly of said rotor element tooth tip and opening onto said rotor element tooth tip in two walls, a vane in each rotor element tooth opening having a head portion corresponding at least in part to said generally annular shape of said opening and residing therein and having a body portion extending along said walls of said opening and beyond said rotor element tooth tip, resilient means acting on said vane head to urge said vane at all times to an extending position, each said vane being slidable over a stator lobe only when it is the principal sealing means between a pressure stroke in a pocket and an intake stroke in an adjacent pocket, not more than two vanes being active at any one time.

3. In an internal gear hydraulic device having an internally toothed gear element with a plurality of lobes defining pockets, an externally toothed gear element having a plurality of teeth interfittable into said pockets upon relative rotation of said gear elements, said internally toothed gear element having at least one more pocket than said externally toothed element has teeth relative rotation of said gear elements, causing orbiting of one of said gear elements about the axis of rotation of the other of said gear elements, each of said externally toothed gear element teeth having a tip and being movable adjacent a lobe into a pocket on a pressure stroke with an adjacent pocket being on an intake stroke; the improvement comprising a vane assembly for each externally toothed gear element, each said vane assembly comprising wall means in each said externally toothed gear element tooth defining an opening extending the width thereof and opening onto said externally toothed gear element tooth tip, a vane in each externally toothed gear element tooth opening and extending beyond said externally toothed gear element tooth tip, resilient means acting on said vane to urge said vane at all times to an extended position, means acting between each said vane and the wall means of the opening within which it resides to limit outward movement of said vane, each said vane being slidable over an internally toothed gear element lobe only when it is the principal sealing means between a pressure stroke on a pocket and an intake stroke in an adjacent pocket, not more than two vanes being active at any one time.

4. In an internal gear pump having a fixed stator gear element with a plurality of lobes defining pockets, a movable rotor element having a plurality of teeth interfittable into said pockets upon rotation of said rotor element, said stator gear element having more pockets than said rotor element has teeth, rotation of said rotor element about its axis causing orbiting of its axis about the axis of said stator gear element, each rotor element tooth having a tip and being movable adjacent a lobe into a pocket to produce a pump stroke with a pocket behind being on an intake stroke; the improvement comprising a vane assembly for each rotor element tooth, each said vane assembly comprising wall means in each said rotor element tooth defining an opening extending the width thereof and opening onto said rotor element tooth tip, a vane having walls residing in each rotor element tooth opening and extending beyond said rotor element tooth tip, said wall means of said opening and said walls of said vane being so spaced as to provide for the leakage of fluid from a pocket to the end of the vane in said opening only when said vane is in active sealing engagement against a lobe to urge said vane more strongly into engagement with said lobe, resilient means acting on said vane to urge said vane at all times to an extended position, means acting between each said vane and the wall means of the opening within which it resides to limit outward movement of said vane, each said vane being slidable over a stator lobe only when it is the principal sealing means between a pump stroke on a pocket and an intake stroke in a pocket behind, each said vane being in active sealing engagement with a lobe only a portion of the angular travel of said rotor element, not more than two vanes being active at any one time, the angle of contact between said vanes and said lobes being not larger than about 30° to 60° and engagement of said vanes with a given lobe being in a direction to cause said vane to be moved in the opening in which it resides to provide a larger leakage path of fluid from a pump stroke in a pocket which said vane is sealing against.

5. In an internal gear hydraulic device having a fixed stator gear element with a plurality of lobes defining pockets, a movable rotor element having a plurality of teeth interfittable into said pockets upon rotation of said rotor element, said stator gear element having more pockets than said rotor element has teeth, rotation of said rotor element about its axis causing orbiting of its axis about the axis of said stator gear element, each rotor element tooth having a tip and being movable adjacent a lobe into a pocket on a pressure stroke with an adjacent pocket being on an intake stroke; the improvement comprising a vane assembly for each rotor element tooth, each said vane assembly comprising wall means in each said rotor element tooth defining an opening extending the width thereof and opening onto said rotor element tooth tip, a vane having walls residing in each rotor element tooth opening and extending beyond said rotor element tooth tip, said wall means of said opening and said walls of said vane being so spaced as to provide for the leakage of fluid from a pocket to the end of the vane in said opening when said vane is in active sealing engagement against a lobe to urge said vane more strongly into engagement with said lobe, resilient means acting on said vane to urge said vane at all times to an extended position, means acting between each said vane and the wall means of the opening within which it resides to limit outward movement of said vane, each said vane being slidable over a lobe only when it is the principal sealing means between a pressure stroke on a pocket and an intake stroke in an adjacent pocket, each said vane being in active sealing engagement with a lobe only a portion of the angular travel of the rotor element, not more than two vanes being active at any one time, and the angle of contact between said vanes and said lobes being not larger than about 30° to 60°.

References Cited by the Examiner
UNITED STATES PATENTS

| Re. 25,291 | 12/1962 | Charlson | 91—56 |
|---|---|---|---|
| 1,252,160 | 1/1918 | Pagel | 103—126 |
| 1,497,239 | 6/1924 | Johnson | 123—8 |
| 2,195,886 | 4/1940 | Hawley | 103—126 |
| 2,843,049 | 7/1958 | Sherwood | 103—117 |
| 2,866,417 | 12/1958 | Nubling | 103—126 |
| 3,087,436 | 4/1963 | Dettlof et al. | 103—130 |

MARK NEWMAN, *Primary Examiner.*

WILBUR J. GOODLIN, *Examiner.*